(12) United States Patent
Oishi et al.

(10) Patent No.: US 6,477,328 B1
(45) Date of Patent: Nov. 5, 2002

(54) SHUTTER FOR A CAMERA

(75) Inventors: Seiichi Oishi, Chiba-ken (JP); Seiichi Imano, Chiba-ken (JP)

(73) Assignee: Seiko Precision Inc. (JP)

( * ) Notice: Subject to any disclaimer, the term of this patent is extended or adjusted under 35 U.S.C. 154(b) by 0 days.

(21) Appl. No.: 09/644,479

(22) Filed: Aug. 23, 2000

(30) Foreign Application Priority Data

Aug. 23, 1999 (JP) ............................................ 11-235497

(51) Int. Cl.$^7$ .................................................. G03B 7/00
(52) U.S. Cl. ........................ 396/213; 396/244; 396/475; 396/493
(58) Field of Search ................................ 396/244, 247, 396/213, 357, 456, 463, 475, 481, 493

(56) References Cited

U.S. PATENT DOCUMENTS

| | | | | |
|---|---|---|---|---|
| 4,408,857 A | * | 10/1983 | Frank | 396/242 |
| 4,423,934 A | * | 1/1984 | Lambeth et al. | 396/661 |
| 4,697,908 A | * | 10/1987 | Ogihara et al. | 396/244 |
| 5,040,017 A | * | 8/1991 | Arai | 396/244 |

FOREIGN PATENT DOCUMENTS

| | | |
|---|---|---|
| GB | 2196135 | 4/1988 |
| GB | 2246869 | 2/1992 |
| GB | 2309532 | 7/1997 |

* cited by examiner

*Primary Examiner*—Russell Adams
*Assistant Examiner*—Michelle Nguyen
(74) *Attorney, Agent, or Firm*—Adams & Wilks

(57) ABSTRACT

A shutter for a camera comprises sectors for opening and closing a shutter opening by reciprocal pivotal movement, a motor for reciprocally and pivotally moving the sectors by forwardly and reversely rotating a rotor of the motor by forward and reverse electricity conduction to a coil, a memory circuit having stored therein electricity conduction data of the coil corresponding to operational characteristics of the motor and the sectors, and a control circuit for controlling electricity conduction to the coil in accordance with a brightness of an object to be photographed and executing exposure control in accordance with the brightness of the object. The electricity conduction data includes reverse pulses for rotating the rotor in a direction reverse to a direction of opening the sectors for reducing acceleration of the sectors during opening movement thereof, and forward pulses for rotating the rotor in the direction of opening the sectors for continuing the opening movement of the sectors.

13 Claims, 3 Drawing Sheets

US 6,477,328 B1

SHUTTER FOR A CAMERA

BACKGROUND OF THE INVENTION

The present invention relates generally to a shutter for a camera having a motor for effecting opening and closing of a set of shutter sectors, and more particularly to a shutter for a camera in which the motor is decelerated during the opening movement of the sectors to accurately stop the sectors at desired positions.

In a shutter for a camera having a motor for rotating a rotor by conducting electricity to a coil to effect opening and closing of a shutter opening by sectors driven by the motor, the operation of opening the sectors is carried out by conducting electricity to the coil in a forward direction and the operation of closing the sectors is carried out by conducting electricity to the coil in a reverse direction, or by the return force of the rotor or by a return spring.

In such a shutter, the opening movement of the sectors is started by conducting electricity to the coil in the forward direction, and often the actual fully opened positions of the sectors differ from the desired positions due to the inertia of the moving parts, such as the rotor and the sectors. Hence, the applicants have proposed to store time data of exciting the coils in correspondence with respective exposure amounts based on characteristics of the shutter mechanism and to control the operation of opening and closing the shutter based on the stored time data (Japanese Patent Publication No. 7169/1995).

However, according to this method, the rotor undergoes accelerating motion by conducting electricity to the coil in the forward direction and accordingly, the sectors are fully opened rapidly in a short period of time and it is difficult to stop the sectors at the desired positions. Therefore, it has not been possible to construct, using this method, a program shutter which operates with high performance. Further, it is difficult to control the operational timings of the shutter such that flash light is emitted at a diaphragm aperture position in correspondence with a distance to an object to be photographed. Moreover, there exists a problem in that an error with respect to a proper value of the diaphragm aperture is increased by even a small deviation in the timing of the flashing light and excellent picture photographing cannot be carried out.

SUMMARY OF THE INVENTION

In order to resolve the above-described problems, according to an aspect of the present invention, during the opening movement of the shutter sectors by conducting electricity to the coil in the forward direction, electricity is periodically conducted to the coil in the reverse direction to decelerate the speed of the opening movement of the sectors. Thereby, the opening movement of the sectors is delayed as slow as possible and control of stopping the sectors at desired stop positions is facilitated. Further, control of flash timing is also facilitated and therefore, an inexpensive program shutter can be provided.

According to the invention, a shutter for a camera comprises sectors for opening and closing a shutter opening by reciprocal pivotal movement, a motor for reciprocally and pivotally moving the sectors by forwardly and reversely rotating a rotor by forward and reverse electricity conduction to a coil, a memory circuit stored with electricity conduction data of the coil in correspondence with operational characteristics of the motor and the sectors, and a control circuit for controlling electricity conduction to the coil in accordance with the brightness of an object to be photographed and executing exposure control in accordance with the brightness of the photographed object, wherein the electricity conduction data comprises pulses for rotating the rotor in a direction reverse to a direction of opening the sectors for reducing acceleration during the opening motion of the sectors and pulses for rotating the rotor in the direction of opening the sectors for continuing to open the sectors.

DETAILED DESCRIPTION OF THE INVENTION

Figure 1:
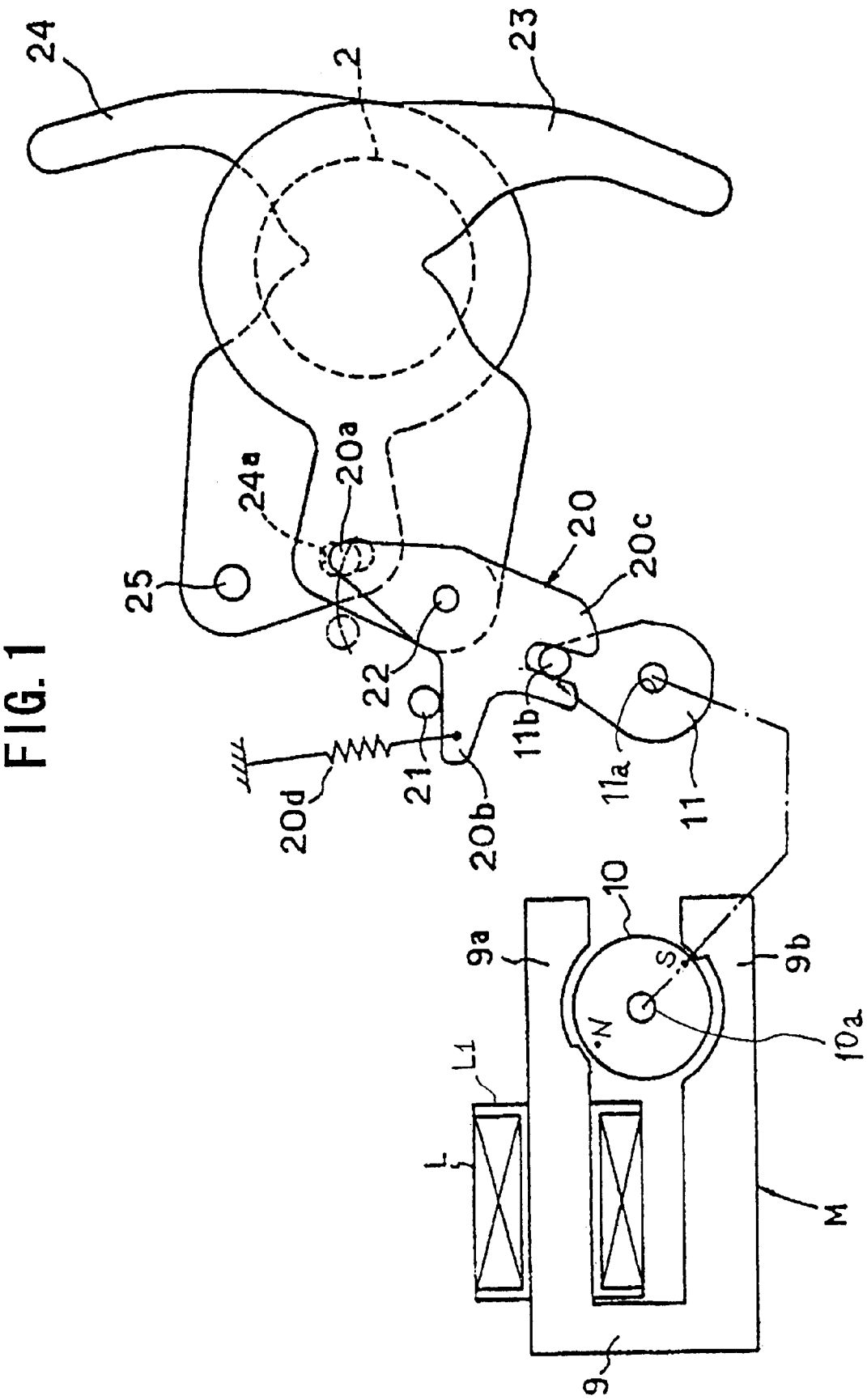
FIG. 1 is a plan view showing an initial state of a shutter for a camera according to an embodiment of the present invention.

An explanation will be given of an embodiment of the invention with reference to the drawings. In FIG. 1, a stator 9, a rotor 10 and a coil L constitute a motor M. The stator 9 is provided with a coil bobbin L1 wound with the coil L and by conducting electricity to the coil L, an N pole and an S pole are selectively generated at pole portions 9a and 9b of the stator 9. By changing the direction of conducting electricity to the coil L, the rotor 10 can be rotated both in a forward direction and in a reverse direction.

A set of shutter sectors 23 and 24 driven by rotating the motor M are arranged symmetrically relative to a shutter opening 2. The sector 24 is pivotably supported on a shaft 25 projected from a base plate (not illustrated), and the sector 23 is pivotably supported on a shaft 22 projected from the base plate. A sector opening-and-closing lever 20 is pivotably supported on the shaft 22 at an upper face of the sector 23. A spring 20d is connected at an arm portion 20b of the sector opening-and-closing lever 20 and urges the sector opening-and-closing lever 20 in the clockwise direction as viewed in FIG. 1. The sector opening-and-closing lever 20 is brought into contact with a pin 21 provided on the base plate to thereby restrict further rotation in the clockwise direction. A pin 20a provided at one end of the sector opening-and-closing lever 20 is engaged with the sector 23 and engaged with a groove portion 24a of the sector 24 to thereby drive the sectors 23 and 24. A fork portion 20c is provided at the other end of the sector opening-and-closing lever 20 and engages with a pin 11b of a rotor operating lever 11.

The rotor operating lever 11 has a hole portion 11a fixedly press-fitted to a rotating shaft 10a of the rotor 10 so that the rotor operating lever 11 moves integrally with the rotor 10. The pin 11b provided at one end of the rotor operating lever 11 slidably engages with the fork portion 20c of the sector opening-and-closing lever 20. Therefore, when the rotor 10 is rotated or angularly displaced in the clockwise direction, the rotor operating lever 11 is also pivotally moved or angularly displaced in the clockwise direction whereupon the sector opening-and-closing lever 20 is pivotally moved or angularly displaced in the counterclockwise direction by the rotor operating lever 11 to thereby operate the sectors 23 and 24.

The rotation or angular displacement of the rotor 10 is carried out by a motor drive unit 8 provided in a camera main body. The rotor drive unit 8 pivotally or angularly drives the rotor 10 by receiving electricity conduction data from a control circuit 7. The control circuit 7 reads information of film sensitivity from an ISO information reading circuit 27, information of brightness of an object to be photographed from a light measuring unit 26 and, depending on the sophistication of the shutter, other information affecting the exposure value, determines an exposure amount, and reads the electricity conduction data of an electricity conduction time period and an electricity conduction direction for operating the rotor 10 in correspondence with the exposure amount from a memory circuit 5. Details of the content of the electricity conduction data will be described later.

Figure 2:
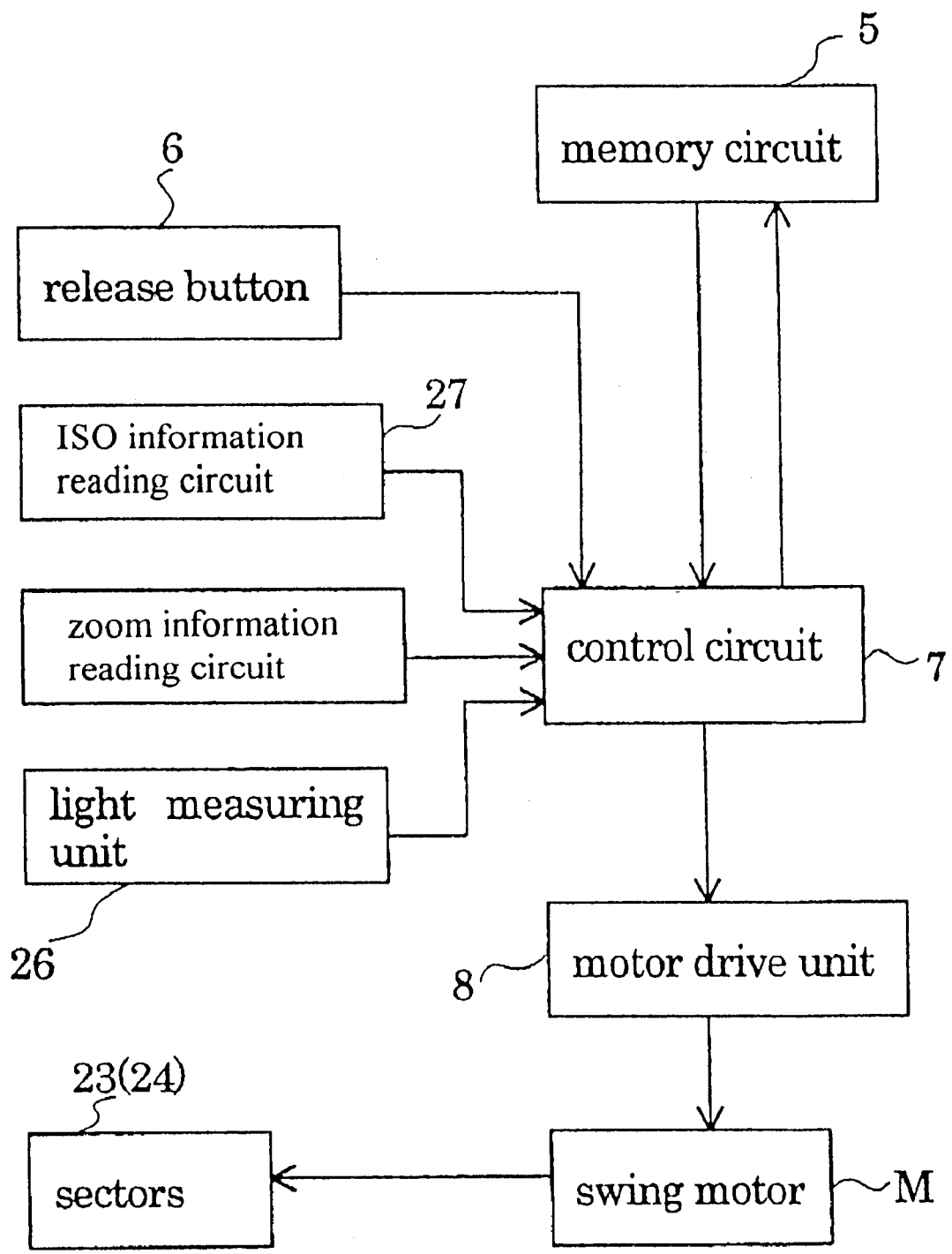
FIG. 2 is a block diagram of the shutter for a camera according to the embodiment of the invention.

An explanation will next be given of the operation of such a motor-controlled shutter. FIG. 1 shows a state before operating the shutter. In this state, when a release button 6 of the camera shown in FIG. 2 is initially operated, the exposure positions. of the sectors 23 and 24 are determined by the control circuit 7 according to brightness information of the object to be photographed read from the light measuring unit 26, film sensitivity information read from the ISO information reading circuit 27 and the like shown in FIG. 2. Thereafter, the electricity conduction data for driving the sectors 23 and 24 to the desired exposure positions is read from the memory circuit 5. In order to drive the sectors 23 and 24 to the desired exposure positions, the electricity conduction in correspondence with the electricity conduction data is carried out for the coil L shown in FIG. 1 by the control circuit 7 via the motor drive unit 8.

By way of example, by conducting electricity to the coil L, firstly, an S pole is generated at the pole portion 9a of the stator 9 and an N pole is generated at the pole portion 9b thereof and the rotor 10 is rotated or angularly displaced in the clockwise direction. By the rotational movement of the rotor 10, the rotor operating lever 11 which is fixedly press-fitted to the rotor 1 is also pivotally moved in the clockwise direction on the shaft 10a and accordingly, by pivotally moving the rotor-operated lever pin 11b in the clockwise direction, the sector opening-and-closing lever 20 is pivoted in the counterclockwise direction. In accordance therewith, the sectors 23 and 24 are pivotally moved in directions opposed to each other via the sector opening-and-closing lever pin 20a provided on the sector opening-and-closing lever 20, and the exposure opening starts to form.

The sectors 23 and 24 are pivotally moved to predetermined exposure positions determined by the control circuit 7. Thereafter, electricity is conducted to the coil L in the reverse direction by a reverse pulse to rotate the rotor 10 in the counterclockwise direction, the sectors 23 and 24 are pivotally moved in the reverse direction (counterclockwise direction), and the exposure operation is finished and the sectors 23 and 24 return to the initial state of FIG. 1.

The electricity conduction data is derived taking into consideration the inertia of the rotor 10 and the sector opening-and-closing lever 20 and the sectors 23 and 24. Specifically, when electricity is conducted to the coil L in the forward (regular) direction by a forward pulse in the time period T1, the rotor 10 starts rotating in the clockwise direction and, at the same time, the rotor operating lever 11 operates the sector opening-and-closing lever 20 and the sectors 23 and 24 start their opening motion. Further, the electricity conduction data is constituted such that when the speed of the opening motion of the sectors increases to a certain degree, due to the acceleration caused by the inertia of the rotor 10, the sectors 23 and 24 and the like, and before the speed increases further, electricity is conducted to the coil L in the reverse direction, whereupon the speed of the sectors 23 and 24 is decelerated and successively thereafter, electricity is conducted to the coil L in the forward direction.

An explanation will be given next of the operation of the shutter with reference to the timing diagrams shown in FIG. 3. FIG. 3(a) shows a state of motion Mo of opening the sectors 23 and 24 and motion Mc of closing thereof as a function of time (abscissa) and shutter opening diameter (ordinate). As representative examples, FIG. 3(a) shows the opening and closing motions of the sectors 23 and 24 under two exposure conditions, namely, exposure E1 represents a comparatively bright case (brightly lit object) and exposure E2 represents a comparatively dark case (poorly lit object).

Figures 3A, 3B, 3C:
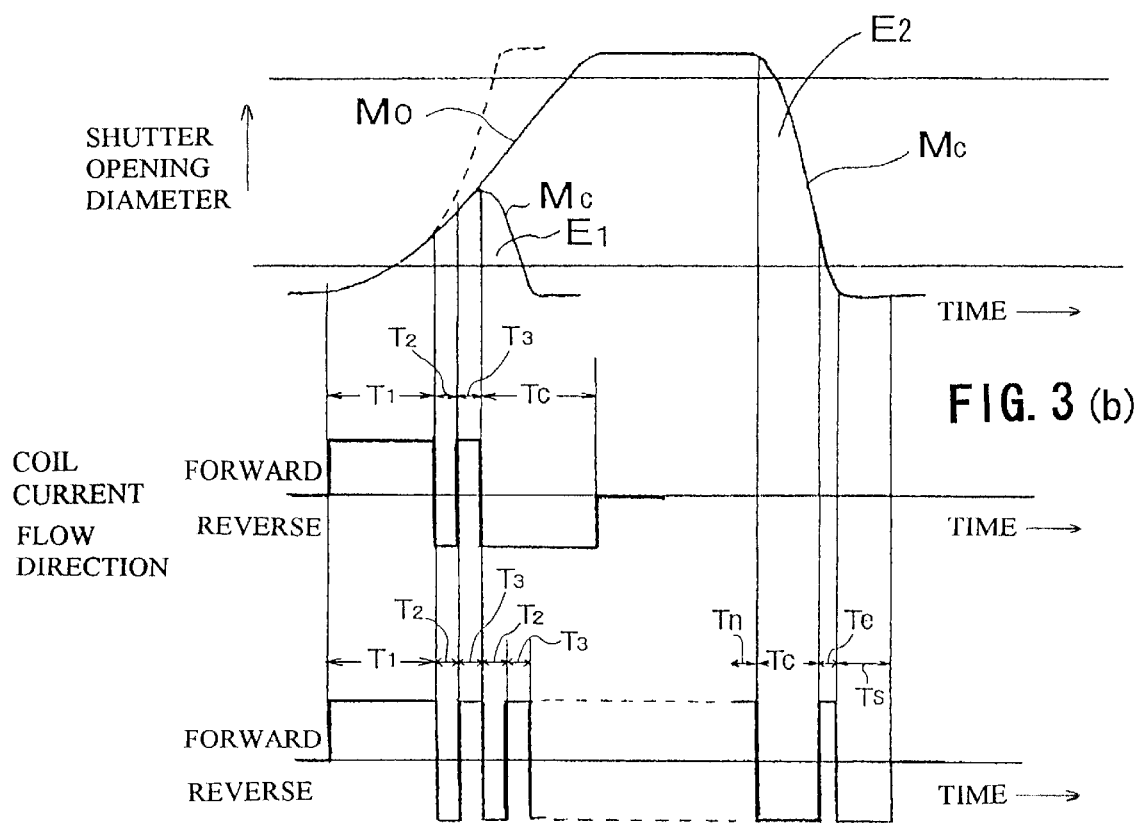
FIGS. 3(a)–3(c) are timing diagrams showing the relation between the motion of the shutter for a camera and electricity conduction data according to the invention.

FIG. 3(b) shows the electricity conduction data comprised of forward and reverse pulses for conducting electricity to the coil L with respect to time for the exposure E1, and FIG. 3(c) shows the electricity conduction data comprised of forward and reverse pulses for conducting electricity to the coil L with respect to time for the exposure E2. Electricity conduction in the forward direction for a time period T1, for example, 1.6 ms (milliseconds) for the opening motion Mo to the coil L is carried out by the motor drive unit 8 and the motor M is rotated or angularly displaced in the forward direction, thereby causing the sectors 23 and 24 to start the opening motion Mo. During the course of the opening motion Mo and before the opening speed of the sectors 23 and 24 increases beyond some prescribed degree or limit due to acceleration caused by the inertia of the rotor 10, the sectors 23 and 24 and so on, electricity is conducted to the coil L in the reverse direction by a reverse pulse in a short time period T2 (for example, 0.4 ms) to thereby decelerate the speed of the sectors, and thereafter electricity is conducted again in the forward direction by a forward pulse for a short time period T3 (for example, 0.6 ms) to complete the opening motion Mo of the sectors 23 and 24 to the desired exposure positions. Thereafter, when the necessary exposure E1 is achieved, electricity conduction in the reverse direction by a reverse pulse for the closing motion Mc is outputted in a time period Tc.

Even when the exposure amount in correspondence with the brightness of the object being photographed is achieved in the midst of the time period T2 or T3, at the correct time the electricity conduction data can shift to the electricity conduction data in the reverse direction for the closing motion Mc.

In the case of exposure E2, wherein the object being photographed is much darker than in the case of exposure E1, the electricity conduction data in the form of reverse and forward pulses is repeatedly outputted in the time periods T2 and T3 for the opening motion Mo and is continued until the sectors 23 and 24 are fully opened to the desired exposure positions. Mores particularly, electricity conduction to the coil L in the forward direction by a forward pulse for a time period T1 is carried out by the motor drive unit 8. After time period T1, electricity conduction is carried out alternately in the reverse and forward directions by reverse and forward pulses during time periods T2 and T3 to decelerate the opening speed of the sectors 23 and 24 during the remaining period of the opening motion Mo of the sectors.

According to a preferred aspect of the invention, the time periods T2 and T3 and corresponding pulses are unitized and made equal in duration to one another and thus the amount of data needed to be stored is reduced and accordingly, the capacity of the memory circuit 5 can be reduced. Therefore, it is not necessary to use a memory circuit having a large capacity as the memory circuit 5. Further, the number of time periods T2 and T3 and corresponding reverse and forward pulses that are unitized may be determined in conformity with the environment where the shutter device will be used. However, if desired, the time periods T2 and T3 may be made different from one another, or selected ones of the time periods T2 and/or T3 may differ from other ones, though such would require a much larger capacity memory circuit.

When the electricity conduction data is outputted to correspond to the exposure E2, the electricity conduction data in the reverse direction for the closing motion Mc is outputted in the time period Tc. Further, in order to prevent rebounding motion of the sectors 23 and 24 and the like at the end of the shutter closing cycle, electricity conduction data in the forward direction is outputted for a short period of time Te to decelerate the sectors during their closing motion Mc, and thereafter electricity conduction data in the reverse direction for a time period Ts is continuously outputted for ensuring the closing motion Mc of the sectors 23 and 24.

Although according to this embodiment, an explanation has been given of an example in which the electricity conduction data in the reverse direction is outputted during the closing motion Mc, the closing motion Mc may be carried out forcibly by the spring 20d of the sector opening-and-closing lever 20 without outputting the electricity conduction data in the reverse direction and accordingly, the closing motion Mc may be entrusted solely to the motive force of the spring 20d.

Further, although after the electricity conduction in correspondence with the exposure E1, the closing motion Mc is carried out and the electricity conduction data in the reverse direction is outputted during the time period Tc, the time period Tc is set in correspondence with an output calculated in accordance with the brightness of the object being photographed by the control circuit 7. Further, in this case, the electricity conduction data in the forward direction necessary for preventing the above-described rebounding motion of the sectors is outputted in correspondence with the time period Te.

In accordance with the present invention, the electricity conduction data is constituted such that during the opening motion of the sectors, the electricity conduction data in the reverse direction is outputted only for a short period of time and accordingly, the sectors can be controlled such that sectors are not fully opened rapidly but rather are opened comparatively slowly. Therefore, fine diaphragm control can easily be carried out and control of the light emitting timing of flash light can easily be carried out. Further, when the electricity conduction data is unitized, the amount of the electricity conduction data can be reduced so that a memory having a large capacity is not needed.

We claim:

1. A shutter for a camera comprising:

sectors for opening and closing a shutter opening by reciprocal pivotal movement; a motor for reciprocally and pivotally moving the sectors by forwardly and reversely rotating a rotor of the motor by forward and reverse electricity conduction to a coil of the motor; a memory circuit having stored therein electricity conduction data of the coil corresponding to operational characteristics of the motor and the sectors, the electricity conduction data including pulses for rotating the rotor in a direction of opening of the sectors during opening movement thereof, and pulses for rotating the rotor in a direction reverse to the direction of opening of the sectors for reducing acceleration of the sectors while continuing the opening movement during the opening movement of the sectors; and a control circuit for controlling electricity conduction to the coil in accordance with a brightness of an object to be photographed and executing exposure control in accordance with the brightness of the object.

2. A shutter for a camera according to claim 1, wherein the electricity conduction data is constituted such that the pulses for rotating the rotor in a direction reverse to the direction of opening of the sectors are unitized and repeated a plural number of times.

3. A shutter for a camera according to claim 1; wherein some of the pulses for rotating the rotor in a direction reverse to the direction of opening of the sectors are applied to the coil before the sectors approach completion of opening movement.

4. A shutter for a camera comprising: a set of sectors displaceable in opening and closing directions to open and close a shutter opening; a motor connected to effect displacement of the sectors in response to forward and reverse pulses applied to the motor; a memory circuit for storing pulse data including forward pulses of at least two different pulse widths and reverse pulses of at least two different pulse widths; and a control circuit connected to read pulse data from the memory circuit and apply forward and reverse pulses to the motor to effect opening and closing of the sectors to perform an exposure, the control circuit successively applying to the motor a forward pulse of a longer pulse width to initiate displacement of the sectors in the opening direction, one or more pairs of reverse and forward pulses having a shorter pulse width to decelerate the sectors during continuing displacement of the sectors in the opening direction, and a reverse pulse having a longer pulse width to initiate displacement of the sectors in the closing direction.

5. A shutter for a camera comprising to claim 4; wherein the one or more pairs of reverse and forward pulses having a shorter pulse width comprise pulses of equal pulse width.

6. A shutter for a camera according to claim 4; wherein the control circuit applies to the motor, after applying the reverse pulse having a longer pulse width, a forward pulse having a shorter pulse width than the immediately preceding reverse pulse to reduce rebounding of the sectors at the completion of displacement thereof in the closing direction.

7. A shutter for a camera according to claim 4; wherein the control circuit reads pulse data from the memory circuit in accordance with the brightness of an object to be photographed.

8. A shutter for a camera according to claim 4; wherein the control circuit applies some of the reverse and forward pulses to the motor before the sectors near completion of displacement in the opening direction.

9. A method of operating a shutter for a camera having a set of sectors driven in opening and closing directions by forward and reverse pulses applied to a motor to effect an exposure, the method comprising the steps:

applying a forward pulse to the motor to initiate opening movement of the sectors in the opening direction;

applying one or more pairs of reverse and forward pulses to the motor while the sectors continue to undergo opening movement to decelerate the sectors during the opening movement thereof; and applying a reverse pulse to the motor to initiate closing movement of the sectors in the closing direction.

10. A method according to claim 9; further including the step of applying a forward pulse to the motor, after applying the reverse pulse to the motor to initiate closing of the sectors, to reduce rebounding of the sectors at the completion of closing movement thereof.

11. A method according to claim 9; wherein the pulses constituting the one or more pairs of reverse and forward pulses each has a shorter pulse width than that of the forward pulse applied to initiate opening movement of the sectors and the reverse pulse applied to initiate closing movement of the sectors.

12. A method according to claim 11; wherein the pulses constituting the one or more pairs of reverse and forward pulses all have the same pulse width.

13. A method according to claim 9; wherein the step of applying one or more pairs of reverse and forward pulses includes applying some of the reverse and forward pulses to the motor before the sectors approach completion of opening movement in the opening direction.

* * * * *